(12) United States Patent
Coenen

(10) Patent No.: US 6,253,859 B1
(45) Date of Patent: Jul. 3, 2001

(54) LIFTING DEVICE FOR THE LOWER STEERING ARMS OF AN ATTACHING DEVICE OF A TRACTOR

(75) Inventor: Herbert Coenen, Königswinter (DE)

(73) Assignee: GKN Walterscheid GmbH, Lohmar (DE)

( * ) Notice: Subject to any disclaimer, the term of this patent is extended or adjusted under 35 U.S.C. 154(b) by 0 days.

(21) Appl. No.: 09/479,854

(22) Filed: Jan. 7, 2000

(30) Foreign Application Priority Data

Jan. 9, 1999 (DE) .............................................. 199 00 570
Aug. 23, 1999 (DE) .............................................. 199 39 967

(51) Int. Cl.$^7$ .................................................. A01B 63/00
(52) U.S. Cl. ................................ 172/448; 172/2; 91/527; 91/530; 91/419
(58) Field of Search .................................... 172/439, 440, 172/441, 442, 445, 448, 449, 2, 4; 280/460.1, 461.1; 60/428, 429; 91/508, 521, 522, 523, 525, 527, 530, 513, 419

(56) References Cited

U.S. PATENT DOCUMENTS

| | | | |
|---|---|---|---|
| 4,488,401 | * 12/1984 | Tischer .............................. | 91/530 X |
| 4,571,500 | * 2/1986 | Mucheyer ............................ | 307/154 |
| 4,809,785 | * 3/1989 | Arnold et al. .......................... | 172/9 |
| 4,825,956 | * 5/1989 | Kanato et al. ........................... | 172/2 |
| 5,152,347 | * 10/1992 | Miller ....................................... | 172/7 |
| 5,579,850 | * 12/1996 | Kimura et al. ............................ | 172/4 |
| 5,601,146 | * 2/1997 | Schlegel et al. ..................... | 172/439 |
| 5,823,271 | * 10/1998 | Muller et al. ........................ | 172/450 |
| 6,067,782 | * 5/2000 | Diekhans .......................... | 56/10.2 A |
| 6,070,681 | * 6/2000 | Catanzarite et al. .............. | 180/89.15 |
| 6,076,611 | * 6/2000 | Rozendaal et al. ....................... | 172/4 |
| 6,145,859 | * 11/2000 | Altherr et al. ................ | 280/124.159 |

FOREIGN PATENT DOCUMENTS

| | | |
|---|---|---|
| 2329761 A1 | 1/1975 | (DE) . |
| 2652914 A1 | 12/1977 | (DE) . |
| 3604519 C2 | 1/1988 | (DE) . |
| 19546201 A1 | 6/1996 | (DE) . |
| 9-9717 | * 1/1997 | (JP) . |
| 9-177708 | * 7/1997 | (JP) . |
| 10-98911 | * 4/1998 | (JP) . |
| WO 96/03024 | 2/1996 | (WO) . |

* cited by examiner

Primary Examiner—Victor Batson
(74) Attorney, Agent, or Firm—Harness, Dickey & Pierce, P.L.C.

(57) ABSTRACT

A lifting device for lower steering arms of a tractor has a position recording device (25). The position recording device (25) generates a position signal representing the pivot position of the lower steering arms (2, 3). A piston-cylinder unit (11, 12) acts on the tractor and on the lower steering arm (2, 3). A switching circuit is provided per piston-cylinder unit (11, 12). The switching circuit includes a directional valve (33, 33') with four ports and four switching positions. In a first position of the directional valve (33, 33') all ports are blocked. In a second position, the cylinder chamber at the piston end is connected to the pressure agent supply source and the cylinder chamber at the piston rod end is connected to the return line. In a third position, the cylinder chamber at the piston rod end is connected to the pressure agent supply source and the cylinder chamber at the piston end is connected to the return line. In a fourth position, both cylinder chambers are connected to the return line. A switching unit (28, 28') is provided with a guiding value (F). The guiding value (F) corresponds to the nominal position of the lower steering arm (2, 3). A position signal originates from the position recording device (25, 25') and represents the respective position of the lower steering arm. A comparator compares the guiding value (F) with the position signal. The switching unit (28, 28'), as a function of the result of the comparison, causes the directional valve (33, 33') to occupy one of the four positions.

11 Claims, 4 Drawing Sheets

LIFTING DEVICE FOR THE LOWER STEERING ARMS OF AN ATTACHING DEVICE OF A TRACTOR

CROSS-REFERENCE TO RELATED APPLICATIONS

This application claims priority upon German application 199 00 570.2 filed Jan. 9, 1999 and German application 199 39 967.0 filed Aug. 23, 1999, both of which are incorporated herein by reference.

BACKGROUND OF THE INVENTION

The invention relates to a lifting device for the lower steering arms of an attaching device of a tractor or self-driving implement.

Tractors, or self-driving implements, at their rear or, optionally, also at their front, include an attaching device. The attaching device has lower steering arms which are offset in the direction opposite to the longitudinal axis of the tractor or self-driving implement. One end of the lower steering arms is articulatable. It is attached at the rear and/or front to be pivotable around a substantially horizontal axis. In addition, a slight lateral pivotability exists. At their free ends, the lower steering arms includes couplings to connect with an implement. A lifting device is provided to pivot the lower steering arms. The lifting device, which carries an implement attached to the lower steering arms, raises or lowers the implement relative to the ground. Furthermore, as a function of the implement to be attached and the type of application, the lifting device must enable the lower steering arms, to a certain extent, to move freely sideways to a certain extent. In other applications, free pivotability in the vertical direction is essential. In particular, some types of lifting devices which are integrated into the tractor or the implement and include two parallel lifting arms, are connected to the ends of a lifting shaft. The lifting shaft itself is pivoted by a drive. Thus, the lifting arms move in a circular arch. Lifting struts, which are connected to the lower steering arms, are secured to the ends of the lifting arms. In addition, the lifting shaft ensures synchronization of the two lifting arms. A precision adjustment mechanism is arranged at the rear of the lifting device to improve adaptability. The adjustment mechanism adjusts the length of the lifting struts. Furthermore, an assembly is provided which optionally enables a rigid connection with the lower steering arm or disconnection and free vertical mobility. The assembly enables a vertical floating path for yawing the implement. The assembly compensates for transverse inclinations in order to enable tension-free operation.

In the case of a lifting device attached to the front of the tractor or implement, the lower steering arms are normally connected to one another to form a rocker. The drive is in the form of two hydraulic lifting struts. The struts are connected directly to the lower steering arms. An oblong hole in the coupling element is provided to compensate for vertical degrees of freedom in transverse inclinations.

Such an assembly is described in WO 96/03024. The two hydraulic lifting struts can be connected by a common hydraulic line to a pump or to a pressure supply source. This means that the pressure level is the same for both hydraulic lifting struts. Thus, they are both supplied with the same amount of pressure.

Although the above-described types of lifting devices have different designs, they have a common characteristic. The synchronous movements of the two lower steering arms is ensured and a vertical degree of freedom is available. The hydraulic lifting struts are disadvantageous because accurate uniform operation is not ensured due to leakages which can lead to different settings in spite of identical pressure levels.

SUMMARY OF THE INVENTION

It is an object of the present invention to simplify the design of the lifting device. Also, the invention ensures accurate synchronization with respect to adjustment and, finally, it provides further adjustment possibilities.

In accordance with the invention, a lifting device is provided for the lower steering arms of an attaching device of a tractor. The lower steering arms, at one end, are pivotably attached to the tractor. The lifting device comprises, per lower steering arm, a position recording device. The position recording device generates a position signal which represents the respective pivot position of the lower steering arm. A hydraulically loadable, double-acting piston-cylinder unit is provided per lower steering arm. At one end, the cylinder is attached to the tractor. At its other end, the cylinder acts either directly or indirectly, via an intermediate lever drive, on the lower steering arm. The cylinder includes a cylinder chamber at the piston end and a cylinder chamber at the piston rod end.

A switching circuit is provided per piston-cylinder unit. The switching circuit has a directional valve with four ports. The directional valve can be transferred into at least three switching positions. Two ports serve to connect to the piston-cylinder unit. The first port is connected to the cylinder chamber at the piston end. The second portion is connected to the cylinder chamber at the piston rod end. The third port serves to connect to a pressure agent supply source. The fourth port serves to connect to a return line.

In a first position of the directional valve, all ports of the directional valve are blocked. In a second position, the cylinder chamber at the piston end is connected to the pressure agent supply source. Also, in the second position, the cylinder chamber at the piston rod end is connected to the return line. In a the third position, the cylinder chamber at the piston rod end is connected to the pressure agent supply source. Also, in the third position, the cylinder chamber at the piston end is connected to the return line. The switching circuit has an electric switching unit provided with an input to introduce a guiding value corresponding to the nominal position of the lower steering arm. An input for introducing a position signal comes from the position recording device which represents the respective position of the lower steering arm. A comparator compares the guiding value with the position signal. The switching unit, as a function of the result of the comparison, causes the directional valve to assume one of the at least three positions.

An advantage of this embodiment is that while the design has been simplified, additional functions have been provided. Furthermore, accurate setting is ensured because the respective actual position of the lower steering arms is compared with a predetermined nominal position. Any adjustment that takes place is aimed at the nominal position. Thus, both lower steering arms assume the same or the predetermined position. In addition, by being able to control the piston-cylinder units individually, it is possible to set the two lower steering arms independently of one another. This enables compensation for any transverse inclination.

According to a further embodiment of the invention, a fourth switching position is provided in the directional valve per lower steering arm. Here, both the cylinder chamber at the piston end and the cylinder chamber at the piston rod end are connected to the return pipe. For example, if the piston-cylinder units are switched to "return", the length of the piston-cylinder units can set itself freely and the implement can also be uncoupled in a force-free way. Furthermore, it is possible to set the floating path without the operative having to leave the driver's seat, which is the case with mechanical solutions. To permit synchronization of the lower steering arms, identical or different guiding values are fed into the two switching units.

To complement the solution in accordance with the invention, a selector switch is provided which enables the selection of different operating modes and which acts on both switching units. The two switching units can thus be preprogrammed in such a way that the two lower steering arms are either controlled in accordance with the same guiding value or different guiding values. Furthermore, the two switching units are connected to a common selector switch. Thus, the switching units may be programmed to transfer one directional valve for a specific lower steering arm or directional valves for both lower steering arms into the fourth position. In the fourth position, an exchange of pressure agent takes place between both piston-cylinder unit chambers and the return lines. In a preferred embodiment, the guiding values are manually predeterminable by a setting element. The operative can thus predetermine the desired position of the lower steering arms. Any transverse inclination can be compensated for by using different guiding values for the lower steering arms.

In order to specifically align the implement relative to the tractor when the tractor is transversely inclined, it is also possible to use an inclination sensor. The inclination sensor records the transverse inclination of the tractor. Additionally, it is possible to provide means by which at least one of the two switching units may be provided with a signal which is superimposed on the guiding value representing the transverse inclination. One type of compensation is possible in that the driver himself visually assesses the transverse inclination. For example, it is possible to determine that the lower steering arm closest to the ground is controlled in accordance with a predetermined guiding value. The other lower steering arm is adapted only to be lifted further. In addition, the selector switch has a switching position where the inclination sensor is activated and the signal generated can be superimposed on the guiding value(s) fed into the two switching units. It is also possible to specify maximum differences between the guiding values in order to prevent the components and the attached implement from being subjected to excessive loads. Finally, when the implement is lifted into the transport position, provision can be made for it to be straightened from a certain lifting position onwards.

In order to set the two lower steering arms, a device is used which is able to record the respective extended position of the piston rod of the piston-cylinder unit. It is also possible for the position recording device to be represented by a rotary angle sensor. The sensor records the respective angular position of the associated lower steering arm relative to the tractor.

From the following detailed description, taken in conjunction with the accompanying drawings and subjoined claims, other objects and advantages of the present invention will become apparent to those skilled in the art.

BRIEF DESCRIPTION OF THE DRAWINGS

The drawings show different embodiments of the invention. In principle, the embodiments are suitable for both a rear attaching device and a front attaching device.

FIG. 4 is a perspective view of an embodiment with the lower steering arms loaded indirectly by piston-cylinder units, with a lever drive arranged in between.

DETAILED DESCRIPTION OF THE PREFERRED EMBODIMENT

Figure 1:
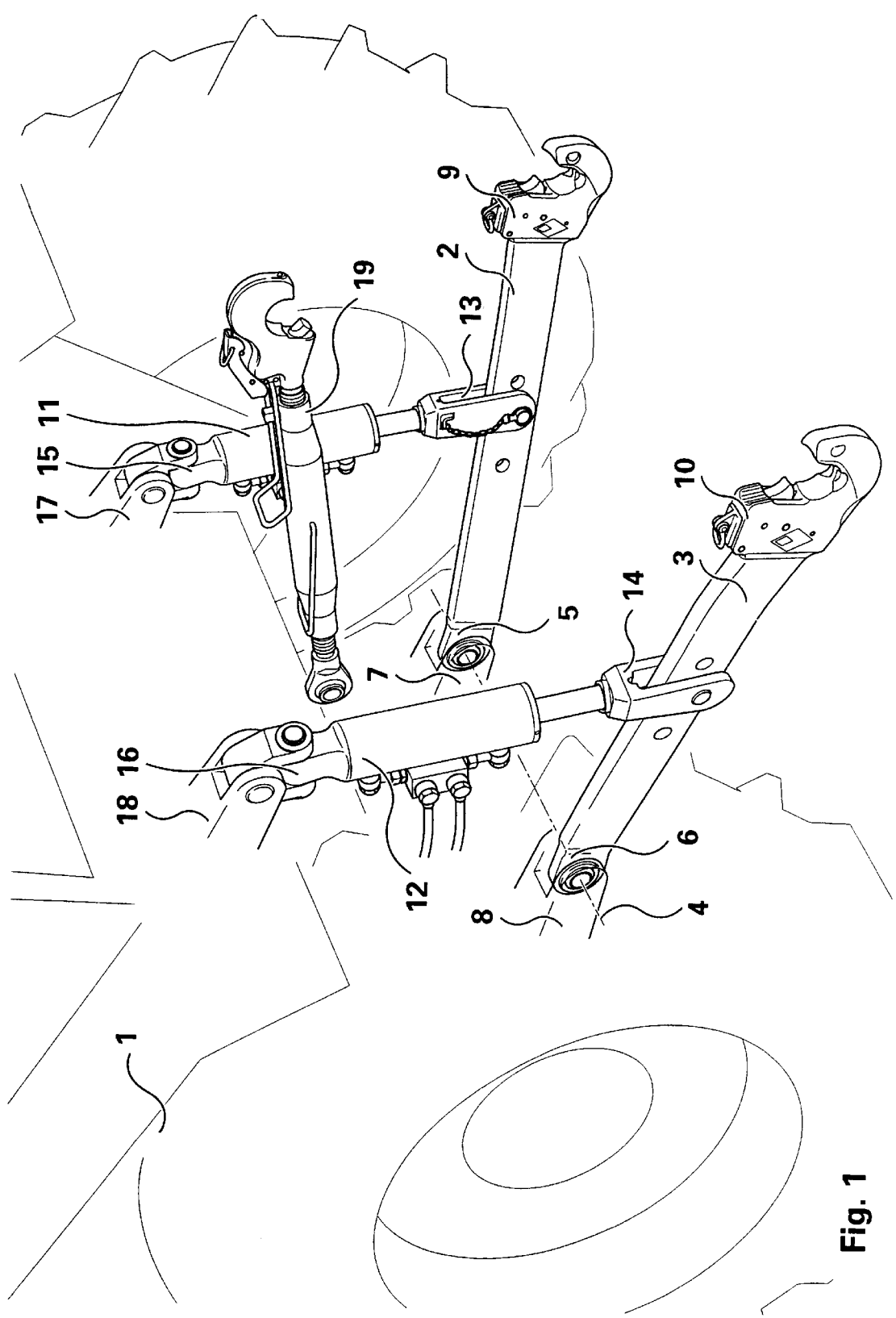
FIG. 1 is a perspective view of a first embodiment of a lifting device for a tractor attaching device arranged at the rear of the tractor.

FIG. 1 shows a tractor rear end with a rear attaching device with two lower steering arms 2, 3. As seen, the right-hand lower steering arm is displaced towards the right and the left-hand lower steering arm is displaced towards the left away from the longitudinal axis of the tractor. Both lower steering arms 2, 3 are pivotably supported by connecting ends 5, 6 on respective bearing blocks 7, 8 of the tractor rear end around a transverse axis 4. The other ends have movable coupling hooks 9, 10. The hooks 9, 10, to a greater or lesser extent, approach the ground on which the tractor 1 is positioned, or moved upwards away from the ground. In order to move the two lower steering arms 2, 3 around the pivot axis 4, each arm 2, 3 is associated with a piston-cylinder unit 11, 12.

The piston-cylinder units 11, 12 act, via a yoke-shaped attaching end 13, 14, on the associated lower steering arm 2, 3. The other connecting ends 15, 16, of the piston-cylinder units 11, 12 are held on bearing blocks 17, 18 secured to the rear of the tractor. The assembly includes an intermediate articulating element which is pivotably connected to the housing of the associated piston-cylinder unit 11, 12 around a first axis. Additionally, the intermediate articulating element is pivotably connected to the respective bearing block 17, 18 around an axis extending parallel to the pivot axis 4. Thus, the piston-cylinder unit 11, 12 is able to be set freely on all sides when adjusting the lower steering arms 2, 3. Furthermore, in the region of the attaching ends 5, 6, the two lower steering arms are slightly tiltable around their longitudinal axes.

An upper steering arm 19 completes the attaching device. The upper steering arm 19 engages the upper attaching means of the associated implement. The two coupling hooks 9, 10 are engaged by the lower attaching elements of the implement.

The functioning of the lifting device which comprises the two piston-cylinder units 11, 12 is described in greater detail in connection with FIG. 2. The two piston-cylinder units 11, 12, which actuate the right-hand and left-hand lower steering arms 2, 3 and their associated switching means, are identical. Thus, below, the description is only with reference to the piston-cylinder unit associated with the left-hand lower steering arm 3. However, it equally applies to the right-hand lower steering arm 2.

The piston-cylinder unit 12 has a housing 20 which adjustable receives the piston 21 with the piston rod 22 projecting from the housing 20. The piston rod 22 carries the attaching end 14 which connects to the left-hand lower steering arm. The housing 20 carries the attaching end 16 which connects to the bearing block provided at the tractor rear end. For further description purposes, the cylinder chamber at the piston end is given the reference number 23, whereas the cylinder chamber at the piston rod end is given the reference number 24.

Figure 2:
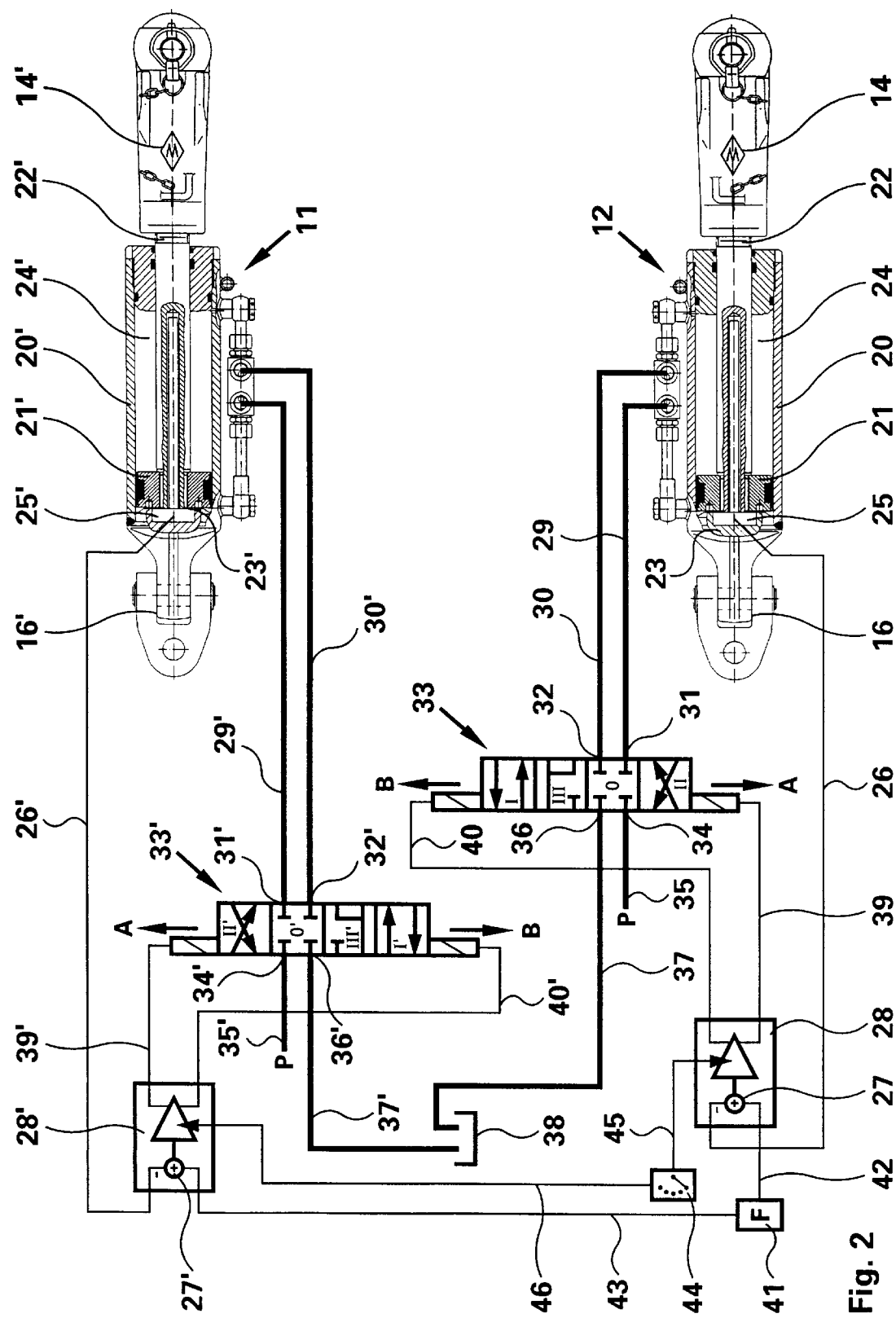
FIG. 2 is a schematic and partial cross-section view of a switching circuit for setting the piston-cylinder units for actuating the lower steering arms.

In FIG. 2, the piston-cylinder unit is shown in the fully shortened position. The cylinder chamber 23 at the piston end occupies a minimum. The cylinder chamber 24 at the piston rod end occupies a maximum. A position recording device 25 is integrated into the piston-cylinder unit 12. The position recording device 25 generates a signal which represents the shortened and the extended position of the piston rod 22 in the housing 20 and thus the length which is obtained between the articulation points of the attaching ends 14, 16.

The position recording device 25 is connected by a signal line 26 to the comparator 27 of a switching unit 28. The piston-cylinder unit 12 is connected by pressure agent lines 29, 30 to the two ports 31, 32 of a directional valve 33. The pressure agent line 29 provides a connection between the cylinder chamber 23 at the piston end and the first port 31. The second pressure agent line 30 provides a connection between the cylinder chamber 24 at the piston rod end and the second port 32 of the directional valve 33.

The directional valve 33 has two further ports. A third port 34 is connected to the pressure line 35. The pressure line 35 is fed by a pump P or any other pressure agent supply source. The fourth port 36 is connected in a pressure-less way by the return line 37 to tank 38. The directional valve 33 is an electro-magnetically adjustable valve. The directional valve 33 can assume the four positions and establishes or blocks different connections between the ports 31, 32, 34, 36. For this purpose, it is adjustable either in direction A or in direction B. FIG. 2 shows the basic position in which all ports 31, 32, 34, 36 are disconnected from one another.

The movement of the directional valve 33 for the purpose of assuming one of the possible switching positions is effected by suitable control lines 39, 40. Control lines 39, 40 receive their switching pulses from the switching unit 28. The comparator 27 of the switching unit 28, via a control line 42, can be provided with a guiding value F by a manually controllable setting element 41. Accordingly, the raised position of the lower steering arm, with which the piston-cylinder unit 12 is associated, can be set.

The directional valve 33 is shown in the first position. Here, the switching position "O" is shown, with all ports 31, 32, 34, 36 blocked. In the switching position "I", the pressure line 35 is connected by port 34 and port 31 to the pressure agent line 29. Port 31 connects to the cylinder chamber 23 at the piston end. Thus, the piston rod 22 moves out of the housing 20. In position "II" of the directional valve 33, the pressure line 35 is connected by port 34 to port 32. Associated pressure agent line 30 couples port 32 to the cylinder chamber 24 at the piston rod end. Thus, the piston rod 22 moves into the housing 20. This corresponds to the associated lower steering arm being lifted.

In position "III" of the directional valve 33, the connection of the pressure line 35 and of the port 34 is blocked. The pressure agent lines 29 and 30 are connected by the fourth port 36 to the return line 37. Return line 37 leads to the tank 38. Thus, a free exchange of pressure agents is possible. Accordingly, the piston rod can move freely into and out of the housing 20.

The piston-cylinder unit 11 has the same design as that described in connection with the piston-cylinder unit 12. The description of the piston-cylinder unit 12 also applies to the piston-cylinder unit 11. The components of piston-cylinder unit 11 the latter which correspond to those of the piston-cylinder unit 12 have been given the same reference numbers, with an apostrophe being added for differentiating purposes.

The setting element 41 also acts via a control line 43 on the switching unit 28'. This means that the switching unit 28' is provided with the same or a different guiding value F. The guiding valve F, via the control line 42, is fed into the switching unit 28. In addition, a selector switch 44 is provided which acts on both switching units 28 and 28' via control lines 45, 46. The selector switch 44 enables different operating modes to be set. For instance, in a first selected position, it is possible to achieve a mode of operation wherein synchronous adjustment of both lower steering arms is desirable. This means that identical changes in the length of the two piston-cylinder units 11, 12 is required. This also means that the guiding value F fed into the two switching units 28, 28' by the setting element 41 is the same for both piston-cylinder units 11 and 12. Thus, any deviation of the two piston-cylinder units 11, 12 from the guiding value, as a function of the magnitude of the deviation, leads to the individual directional valves 33, 33' being controlled to achieve the respective length settings. These are achieved when the control signal, which is passed on by the position recording device 25, via the signal line 26 to the comparator 27, is reproduced in a magnitude which corresponds to the guiding value F. Then the switching position "O" is assumed. In case of deviations which require the piston rod 22 to be extended or shortened, the directional valve 33 is transferred into one of the other two switching positions "I" or "II". In case the selector switch 44 is transferred into a position where a floating movement of the two lower steering arms is to be permitted, both directional valves 33 are transferred into position "III". If identical guiding values are predetermined by the setting element 41 to actuate the two lower steering arms, both are moved into identical positions.

This system can be complemented by additionally using a transverse inclination sensor. Accordingly, an additional value can be superimposed as a function of the inclined position of the tractor. The selector switch 44 can also provide such a control function and influence the two switching units 28, 28', accordingly. The signal additionally fed into the switching unit 28 or 28' by the inclination sensor can then lead to the guiding value F being superimposed, causing one of the piston-cylinder units 11, 12 to assume a greater or shorter length.

Figure 3:
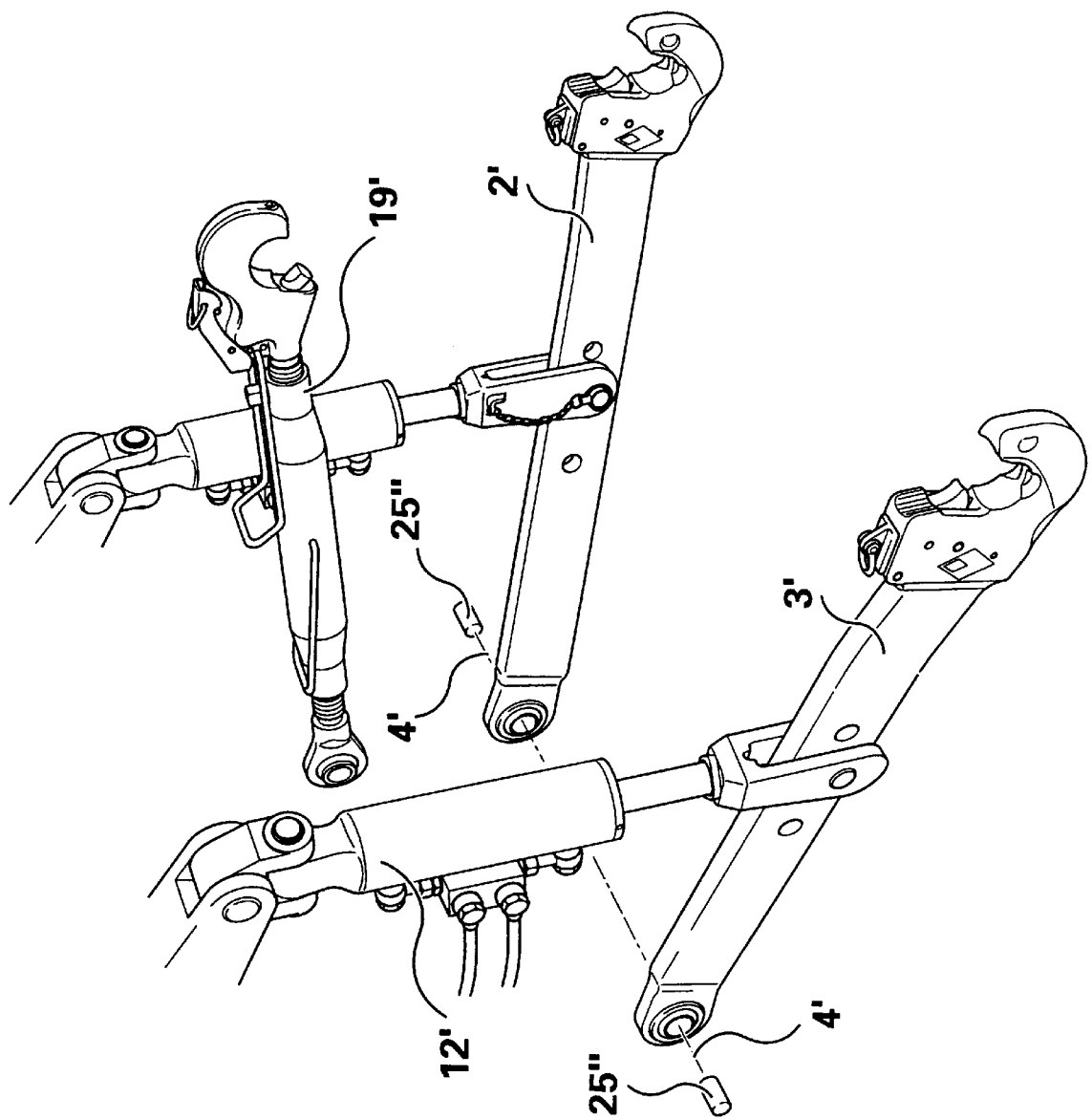
FIG. 3 is a perspective view of an embodiment with the position recording devices provided in the form of rotary angle sensors.

FIG. 3 shows a modified embodiment compared to FIGS. 1 and 2. It also shows two lower steering arms 2', 3' and upper steering arm 19' arranged above steering arms 2', 3'. Each of the two lower steering arms 2', 3', is associated with a piston-cylinder unit 11', 12'. The piston-cylinder units 11', 12' according to FIG. 3 differ from the piston-cylinder units 11, 12 according to FIG. 2 in that they do not include a length measuring device as a position recording device. The position recording devices 25' are provided in the form of rotary angle sensors which are arranged on the pivot axis 4' of the two lower steering arms 2', 3'. The rotary angle sensors record the angular position of the two lower steering arms 2', 3'. The angular position represents the pivot position of the arms. The signal generated by the position recording devices 25' is fed into the respective switching units.

Figure 4:
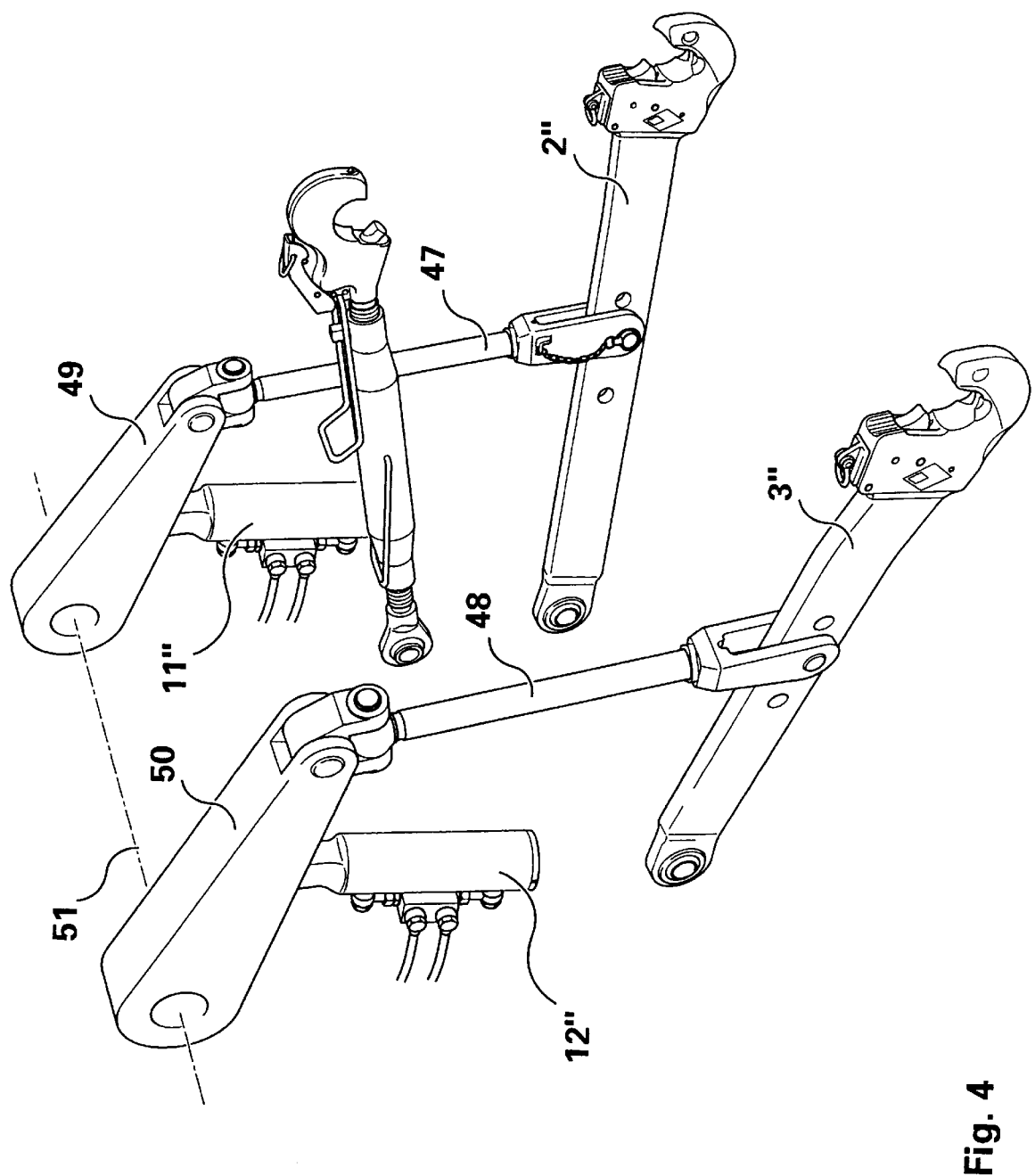

FIG. 4 shows a further embodiment where the two lower steering arms 2", 3" are connected by simple lifting struts 47, 48. The length of the struts is not adjustable. Two lever arms 49, 50 are pivotably adjustable around a common pivot axis 51 and are coupled with struts 47, 48. The two lever arms 49, 50, however, are not synchronized relative to one another. The two lever arms 49, 50 are loaded by two piston-cylinder units 11" and 12". Thus, the two lower steering arms 2" and 3" are actuated, via an intermediate lever drive by the two lifting struts 47, 48 and the associated lever arms 49, 50. The two piston-cylinder units 11" and 12" can be designed as described in connection with FIG. 2. As far as recording the position of the lower steering arms 2", 3" is concerned, it is also possible to provide a design as described in connection with FIG. 3.

While the above detailed description describes the preferred embodiment of the present invention, the invention is susceptible to modification, variation and alteration without deviating from the scope and fair meaning of the subjoined claims.

What is claimed is:

1. A lifting device for lower steering arms of an attaching device of a tractor, said lower steering arms, at one end, are pivotably attached to the tractor, and said lifting device comprises:

a position recording device per lower steering arm, said position recording device generating a position signal representing the respective pivot position of the lower steering arm;

a hydraulically loadable, double-acting piston-cylinder unit per lower steering arm, said piston-cylinder unit, at one end, capable of being attached to the tractor and at its other end capable of acting either directly or indirectly, via an intermediate lever drive, on said lower steering arm, said piston-cylinder unit having a cylinder chamber at a piston end and a cylinder chamber at a piston rod end;

a switching circuit per piston-cylinder unit, said switching circuit having a directional valve with four ports, said directional valve transferring into at least three switching positions, two ports in said directional valve serving to connect to the piston-cylinder unit, a first port connected to the cylinder chamber at the piston end, with a second port being connected to the cylinder chamber at the piston rod end, a third port serving to connect to a pressure agent supply source and a fourth port serving to connect to a return line, and in a first position of the directional valve, all ports of said directional valve are blocked, in a second position, the cylinder chamber at the piston end being connected to the pressure agent supply source and the cylinder chamber at the piston rod end being connected to the return line, in a third position, the cylinder chamber at the piston rod end being connected to the pressure agent supply source and the cylinder chamber at the piston end being connected to the return line and said switching circuit including an electric switching unit provided with an input for introducing a guiding value signal corresponding to the nominal position of the lower steering arm and an input for introducing a position signal generated from said position recording device and representing the respective position of the lower steering arm and a comparator for comparing the guiding value signal with the position signal, with the switching unit, as a function of the result of the comparison, causing the directional valve to assume one of said at least three positions.

2. A lifting device according to claim 1, wherein the directional valve provided per lower steering arm can be transferred into a fourth switching position wherein both the cylinder chamber at the piston end and the cylinder chamber at the piston rod end being connected to the return line.

3. A lifting device according to claim 1, wherein identical guiding value signals are fed into said switching units.

4. A lifting device according to claim 3, wherein said switching units are connected to a common selector switch, said switching units being programmed to control the two lower steering arms on the basis of the same guiding value signal or different guiding value signals.

5. A lifting device according to claim 1, wherein said switching units are connected to a common selector switch, said switching units being programmed to transfer one directional valve for a specific lower steering arm or the directional valves of both lower steering arms into a fourth position.

6. A lifting device according to claim 3, wherein the guiding value signal can be manually predetermined by a setting element.

7. A lifting device according to claim 1, wherein at least one of said switching units can be provided with a signal which represents a transverse inclination of the tractor and said signal being superimposed on the guiding value signal.

8. A lifting device according to claim 7, wherein an inclination sensor records the transverse inclination of the tractor.

9. A lifting device according to claim 8, wherein a selector switch includes a switching position in which the inclination sensor when activated, generates a signal which can be superimposed on the guiding value signals fed into the switching units.

10. A lifting device according to claim 1, wherein said position recording device recording the respective extended position of the piston rod of the piston-cylinder unit.

11. A lifting device according to claim 1, wherein said position recording device being a rotary angle sensor recording the respective angular position of the associated lower steering arm relative to the tractor.

* * * * *